(12) United States Patent
Scheuring et al.

(10) Patent No.: US 7,980,855 B1
(45) Date of Patent: Jul. 19, 2011

(54) STUDENT REPORTING SYSTEMS AND METHODS

(75) Inventors: Sylvia Tidwell Scheuring, Carmel, CA (US); Roger Packard Creamer, Pacific Grove, CA (US); Richard James Lee, Aptos, CA (US); David Schultz, Richmond, CA (US); Darlene Waddington, La Crescenta, CA (US)

(73) Assignee: CTB/McGraw-Hill, Monterey, CA (US)

( * ) Notice: Subject to any disclaimer, the term of this patent is extended or adjusted under 35 U.S.C. 154(b) by 1419 days.

(21) Appl. No.: 11/134,624

(22) Filed: May 23, 2005

Related U.S. Application Data

(60) Provisional application No. 60/572,970, filed on May 21, 2004.

(51) Int. Cl.
*G09B 19/00* (2006.01)

(52) U.S. Cl. ......... 434/118; 434/236; 434/322; 434/350

(58) Field of Classification Search .................. 434/350, 434/323, 362, 118, 322
See application file for complete search history.

(56) References Cited

U.S. PATENT DOCUMENTS

| | | |
|---|---|---|
| 4,958,284 A | 9/1990 | Bishop et al. |
| 5,059,127 A | 10/1991 | Lewis et al. |
| 5,308,244 A | 5/1994 | Hirose |
| 5,395,243 A | 3/1995 | Lubin et al. |
| 5,421,730 A | 6/1995 | Lasker, III et al. |
| 5,433,615 A | 7/1995 | Clark |
| 5,513,994 A | 5/1996 | Kershaw et al. |
| 5,519,809 A | 5/1996 | Husseiny et al. |
| 5,558,521 A | 9/1996 | Clark et al. |
| 5,562,460 A | 10/1996 | Price |
| 5,565,316 A | 10/1996 | Kershaw et al. |
| 5,657,256 A | 8/1997 | Swanson et al. |
| 5,727,951 A | 3/1998 | Ho et al. |
| 5,752,836 A | 5/1998 | Clark et al. |
| 5,779,486 A | 7/1998 | Ho et al. |
| 5,823,789 A | 10/1998 | Jay et al. |
| 5,827,070 A | 10/1998 | Kershaw et al. |
| 5,870,731 A | 2/1999 | Trif et al. |
| 5,879,165 A | 3/1999 | Brunkow et al. |
| 5,890,911 A | 4/1999 | Griswold et al. |
| 5,904,485 A | 5/1999 | Siefert |
| 5,934,909 A | 8/1999 | Ho et al. |
| 5,934,910 A | 8/1999 | Ho et al. |
| 5,947,747 A | 9/1999 | Walker et al. |
| 5,954,516 A | 9/1999 | Heinberg |
| 5,967,793 A | 10/1999 | Ho et al. |
| 6,000,945 A | 12/1999 | Sanchez-Lazer et al. |
| 6,018,617 A | 1/2000 | Sweitzer et al. |
| 6,029,043 A | 2/2000 | Ho et al. |
| 6,039,575 A | 3/2000 | L'Allier et al. |
| 6,064,856 A | 5/2000 | Lee et al. |
| 6,077,085 A | 6/2000 | Parry et al. |

(Continued)

OTHER PUBLICATIONS

Embretson, Susan E., "A Multidimensional Latent Trait Model for Measuring Learning and Change", Psychometrika, vol. 56, No. 3, pp. 495-515; Sep. 1991.

(Continued)

*Primary Examiner* — Xuan M Thai
*Assistant Examiner* — Kang Hu
(74) *Attorney, Agent, or Firm* — Rothwell, Figg, Ernst & Manbeck, PC

(57) ABSTRACT

The present invention relates to, among other things, the interactive reporting of student progress using learning maps.

27 Claims, 16 Drawing Sheets

U.S. PATENT DOCUMENTS

| | | | |
|---|---|---|---|
| 6,112,049 | A | 8/2000 | Sonnenfeld |
| 6,118,973 | A | 9/2000 | Ho et al. |
| 6,137,911 | A | 10/2000 | Zhilyaev |
| 6,144,838 | A * | 11/2000 | Sheehan ............ 434/362 |
| 6,146,148 | A | 11/2000 | Stuppy |
| 6,148,174 | A | 11/2000 | Remschel |
| 6,149,441 | A | 11/2000 | Pellegrino et al. |
| 6,159,018 | A | 12/2000 | Clark et al. |
| 6,164,975 | A | 12/2000 | Weingarden et al. |
| 6,183,260 | B1 | 2/2001 | Clark et al. |
| 6,186,794 | B1 | 2/2001 | Brown et al. |
| 6,186,795 | B1 | 2/2001 | Wilson |
| 6,193,521 | B1 | 2/2001 | Clark et al. |
| 6,212,358 | B1 | 4/2001 | Ho et al. |
| 6,259,890 | B1 | 7/2001 | Driscoll et al. |
| 6,285,993 | B1 | 9/2001 | Ferrell |
| 6,301,571 | B1 | 10/2001 | Tatsuoka |
| 6,336,029 | B1 | 1/2002 | Ho et al. |
| 6,341,212 | B1 | 1/2002 | Shende et al. |
| 6,418,298 | B1 | 7/2002 | Sonnenfeld |
| 6,419,496 | B1 | 7/2002 | Vaughan |
| 6,431,875 | B1 | 8/2002 | Elliott et al. |
| 6,442,370 | B1 | 8/2002 | Driscoll et al. |
| 6,484,010 | B1 | 11/2002 | Sheehan |
| 6,507,726 | B1 * | 1/2003 | Atkinson et al. ............ 434/350 |
| 6,606,480 | B1 | 8/2003 | L'Allier et al. |
| 6,658,412 | B1 | 12/2003 | Jenkins et al. |
| 6,663,392 | B2 | 12/2003 | Leyva et al. |
| 6,666,687 | B2 | 12/2003 | Stuppy |
| 6,675,133 | B2 | 1/2004 | Knowles et al. |
| 6,685,476 | B1 * | 2/2004 | Safran, Sr. ............ 434/169 |
| 6,688,889 | B2 | 2/2004 | Wallace et al. |
| 6,704,741 | B1 | 3/2004 | Lively, Jr. et al. |
| 6,877,989 | B2 | 4/2005 | Embretson |
| 6,918,772 | B2 | 7/2005 | Clark et al. |
| 6,978,115 | B2 | 12/2005 | Whitehurst et al. |
| 6,996,366 | B2 | 2/2006 | L'Allier et al. |
| 7,114,126 | B2 * | 9/2006 | Berger et al. ............ 715/750 |
| 7,121,830 | B1 | 10/2006 | Kaplan et al. |
| 7,127,208 | B2 | 10/2006 | Burstein et al. |
| 7,137,821 | B2 | 11/2006 | Jorgensen et al. |
| 7,162,198 | B2 | 1/2007 | Kuntz et al. |
| 2002/0028430 | A1 | 3/2002 | Driscoll et al. |
| 2002/0182579 | A1 | 12/2002 | Driscoll et al. |
| 2002/0188583 | A1 | 12/2002 | Rukavina et al. |
| 2003/0017442 | A1 | 1/2003 | Tudor et al. |
| 2003/0118978 | A1 | 6/2003 | L'Allier et al. |
| 2003/0129575 | A1 | 7/2003 | L'Allier et al. |
| 2003/0129576 | A1 | 7/2003 | Wood et al. |
| 2003/0152902 | A1 | 8/2003 | Altenhofen et al. |
| 2003/0180703 | A1 | 9/2003 | Yates et al. |
| 2003/0198932 | A1 | 10/2003 | Stuppy |
| 2003/0200077 | A1 | 10/2003 | Leacock et al. |
| 2003/0232315 | A1 * | 12/2003 | Pfund ............ 434/350 |
| 2004/0076941 | A1 | 4/2004 | Cunningham et al. |
| 2004/0086841 | A1 | 5/2004 | Clark et al. |
| 2004/0106088 | A1 | 6/2004 | Driscoll et al. |
| 2004/0229199 | A1 | 11/2004 | Ashley et al. |
| 2005/0086257 | A1 | 4/2005 | Wright |
| 2005/0255439 | A1 | 11/2005 | Cody |
| 2006/0078864 | A1 | 4/2006 | Jorgensen et al. |
| 2006/0160057 | A1 | 7/2006 | Armagost et al. |
| 2006/0188862 | A1 | 8/2006 | Johnson |

OTHER PUBLICATIONS

American Association for the Advancement of Science Literacy, "Laws of Motion", pp. 62-63, 2001.

Bunderson et al., "The Four Generations of Computerized Educational Measurement", In Educational Measurement, 3$^{rd}$ Ed., pp. 387-398, 1989.

Gong, B., et al. "Instructional Assessments: Lever for Systemic Change in Science Education Classrooms", Journal of Science Education and Technology, vol. 1, No. 3, pp. 157-176, 1992.

Helm, L., Los Angeles Times, "The future of software may lie in the obscure theories of an 18th century cleric named Thomas Bayes", 4 pages, Oct. 28, 1996, http://www.cs.berkeley.edu/~murphyk/Bayes/la.times.html.

Henze, N., et al. "Student Modeling in an Active Learning Environment Using Bayesian Networks", Proceedings of the 7$^{th}$ International Conference on User Modeling, UM99 (Banff, CA, 1977) pp. 1-10.

Mioduser, David, et al., "The Weather Lab: An Instruction-Based Assessment Tool Built From a Knowledge-Based System", Journal of Computers in Mathematics and Science Teaching, vol. 17, No. 2/3, pp. 239-263, 1998.

Pellegrino, J.W., et al., "Knowing What Students Know: The Science and Design of Educational Assessment", The National Academies Press, pp. 175-189, 200-206.

STATESTANDARDS.COM, "California Star Standards Test Blueprints", (2003), 1 page, May 11, 2004.

Gagné, R.M. Learning Hierarchies: Chapter 2, pp. 63-84 (1968).

* cited by examiner

| Student-ID | First Name | Last Name | Grade |
|---|---|---|---|
| | | | |
| | | | |

202

| Student-ID | Learning Target | Date | Pknown | Punknown | Pforgot |
|---|---|---|---|---|---|
| | | | | | |
| | | | | | |
| | | | | | |

204

| Student-ID | Item-ID | Date | Response-ID |
|---|---|---|---|
| | | | |
| | | | |

206

| Item-ID | Learning Target | Pknows | Punknown |
|---|---|---|---|
| | | | |
| | | | |

Select a Report

○ Individual Student Report

○ Individual Student Longitudinal Report

⊗ Group Report

○ Longitudinal Group Report

Submit

STUDENT REPORTING SYSTEMS AND METHODS

RELATED APPLICATIONS

This application claims the benefit of U.S. Provisional Patent Application No. 60/572,970, filed on May 21, 2004, the contents of which are incorporated herein.

This application is related to co-pending U.S. patent application Ser. Nos. 10/777,212, filed on Feb. 13, 2004, and 10/644,061, filed on Aug. 20, 2003. The contents of the above identified applications are incorporated herein.

BACKGROUND OF THE INVENTION

1. Field of the Invention

The present invention relates to field of educational reporting systems, and, more specifically, provides systems and methods for reporting student progress and/or knowledge using a learning map, which is device for expressing dependency relationships between and amongst learning targets.

2. Discussion of the Background

A teacher (or other educator) responsible for teaching a subject area to a student would benefit by knowing the student's strengths and weaknesses in the subject area. For example, if the teacher knows the student's strengths and weaknesses in the subject area, then the teacher can spend more time teaching the concepts that the student doesn't know and less time teaching the concepts that the student already knows.

Accordingly, what is desired are systems and methods to enable a student, teacher or other interested party (e.g., parent or tutor) (hereafter "user") to quickly and easily determine the concepts the students knows and/or the concepts the student doesn't know so that the educator can better teach the student.

SUMMARY OF THE INVENTION

In one aspect, the present invention provides systems and methods for using a learning map to enable a user to visualize a student's or group of students' progress (or non-progress) in one or more subject areas. A student can use the systems described herein to inform his or her own learning and track his or her own progress as well.

A learning map includes a network of nodes, with each node representing a particular learning target (i.e., a skill or concept at a particular depth of knowledge) in a well-defined strand of learning in an academic content area or any other domain of learning. Preferably, the nodes are linked together in an ordered way as pre-cursors and post-cursors of each other in an empirically validated learning sequence. Pre-cursor indicators are related to the knowledge that the student should have prior to being taught the learning target. Post-cursor indicators relate to knowledge that the student should be able to acquire more readily after learning the learning target. There can be more than one pre-cursor and/or post-cursor to any given targeted skill, and nodes from one academic area (such as reading language arts) may serve as pre-cursors and/or post-cursors to another academic area (such as mathematical computation). All academic areas may be interconnected into one large learning map.

A method according to some embodiments of the invention includes: (a) administering an assessment to a student, the assessment having one or more questions, at least one question of the assessment being associated with a first learning target; (b) providing a report comprising (b1) a first node associated with the first learning target, (b2) a second node directly connected to the first node, the second node being associated with a second learning target that is a pre-cursor of the first learning target, and (b3) a third node directly connected to the first node, the third node being associated with a third learning target that is a post-cursor of the first learning target; (c) coding the first node, based at least in part on the student's response to the question associated with the first learning target, to indicate (1) whether the student has mastered the first learning target, (2) whether the student has not yet learned the first learning target, (3) whether there is insufficient information to determine the knowledge state of the student with respect to the first learning target, or (4) whether the student has not yet been assessed on the first learning target; and (d) providing means enabling a viewer to view a question associated with the first learning target.

The method may also includes the steps of: providing means directing a user to instructional resources related to one of the learning targets; providing professional development materials for an instructor to use for further instruction on one of the first learning targets, and providing views into other related information such as the text of a given state's standards for assessment on one of the learning targets.

Questions (a.k.a., "items") may broadly include traditional questions, such as, for example, those used in paper and online testing programs, and non-traditional questions, such as, for example, interactions with multimedia and interactive media such as games. In short, a question can be any "device" that is used in determining a student's knowledge of, for example, a subject or concept.

Assessments may broadly include traditional forms of assessment such as collections of question provided online or on paper, individually administered performance assessment, as well as performance measurements based on interactions with a computer game or videogame in which the student's interactions or collections of interactions are correlated to nodes on the learning map. This correlation could be applied to existing assessment or designed into new assessments.

Instructional resources and professional development materials may include traditional materials such as textbooks, videos, reference materials, etc. and may also include nontraditional instructional material such as electronic games, board and cards, games, and all manner of interactive media.

The above and other aspects, features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

FIG. 2A illustrates data structures that may used to store student assessment data.

FIGS. 5-15 illustrate example user interface screens that may be produced by a system according to an embodiment of the invention.

DETAILED DESCRIPTION OF PREFERRED EMBODIMENTS

In one aspect, the present invention provides a reporting system that enables a user to view student assessment results in graphical format.

Figure 1:
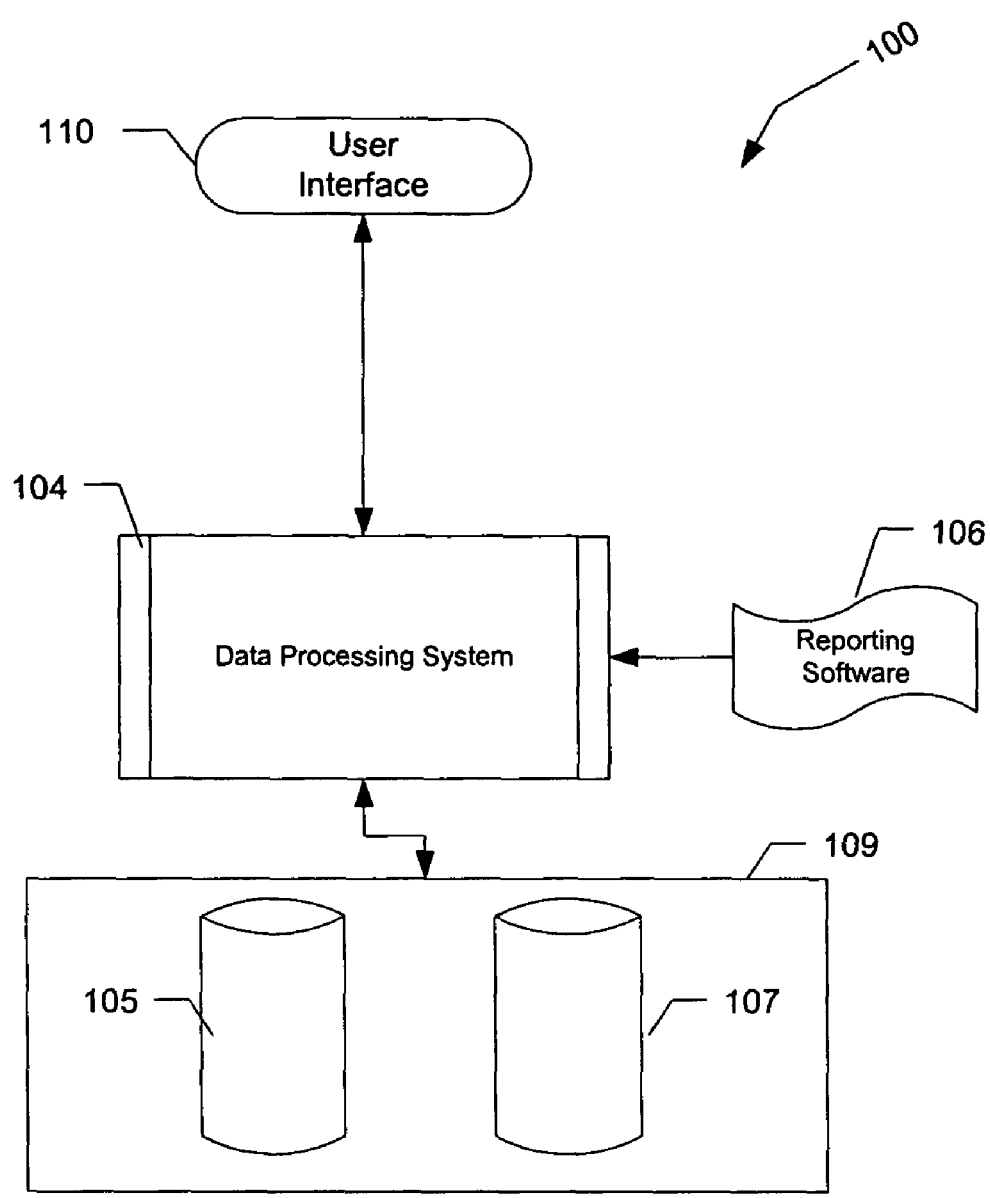
FIG. 1 is a functional block diagram of a reporting system 100 according to one embodiment of the invention.

Referring now to FIG. 1, FIG. 1 is a functional block diagram of a reporting system 100 according to one embodiment of the invention. As shown in FIG. 1, system 100 includes a data processing system 104 having reporting software 106 stored therein and/or accessible thereto and student assessment data 105 and learning map data 107 stored on one or more storage units 109 that may be part of or coupled to system 104.

Data processing system 104 may include one or more general and/or special purpose computers. If more than one computer is used to implement processing system 104, the two or more computers need not be co-located. If they are not co-located, then, in one embodiment, a network (e.g., the Internet or other network) is used to enable the two or more computers to communicate with each other.

Coupled to processing system 104 is a user interface system 110. User interface system 110 may be directly connected to processing system 104 or indirectly coupled to the processing system 104 through, for example, a local or wide area network and zero or more other processing systems. User interface system 110 may include one or more information input and/or output device, such as, for example, a monitor, keyboard, mouse, microphone, speaker or other information input/output device. The user interface may provide for local presentation, remote presentation, or some combination of these.

In some embodiment, reporting software 106 may include one or more executable application programs (e.g., web servers, web browsers and other computer programs), scripts, markup language documents (e.g., HTML, XML, etc.), and/or other software that function together to provide the functionality described herein.

Figure 2B:
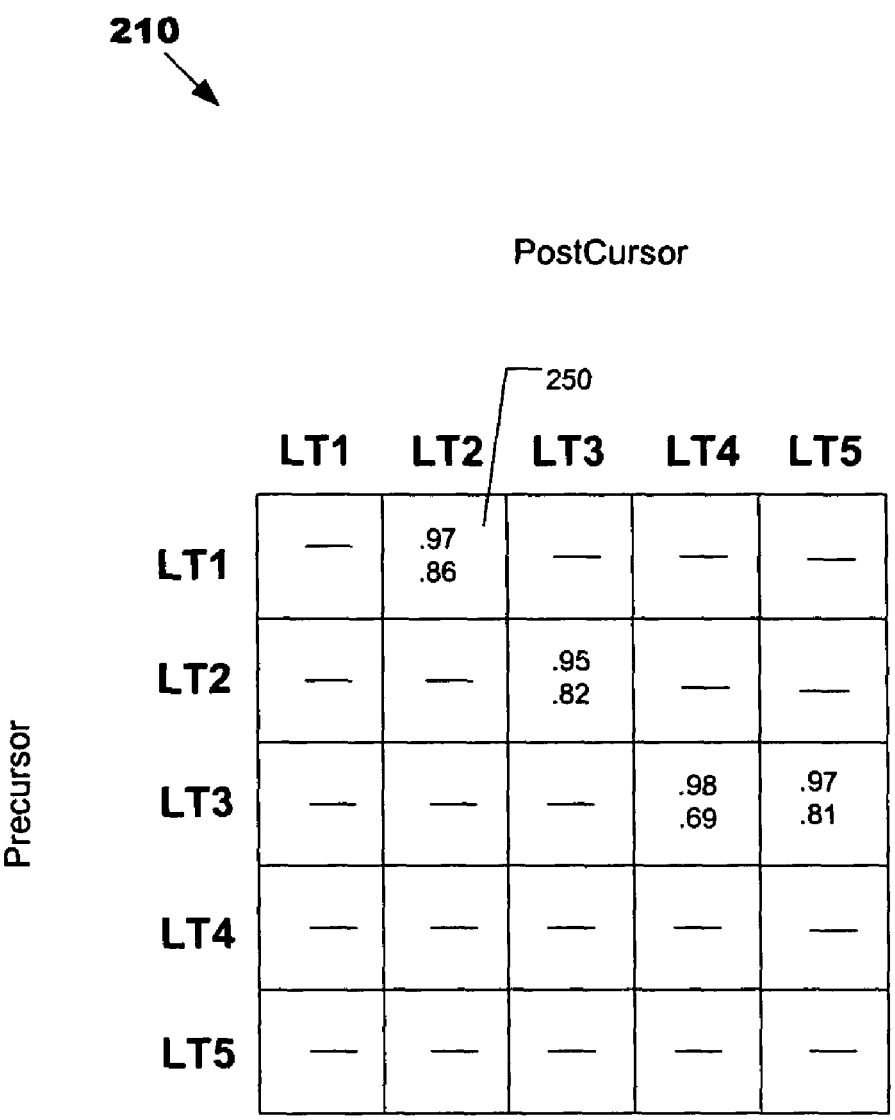
FIG. 2B illustrates a data structure for storing learning map data.

Referring now to FIG. 2A, FIG. 2A illustrates data structures that may used to store student assessment data 105. As shown in FIG. 2A, the student reporting system 100, according to one embodiment, may include the following database elements: a student table 202, a student/learning target table 204, a student/item table 206, and an item/learning target table 208. FIG. 2B illustrates a data structure for storing learning map data 107. As shown in FIG. 2B, system 100 may include a learning map table 210. Although the database elements shown in FIGS. 2A,B may be tables from a relational database, other types of databases may be used. The invention is not limited to any particular data model or database technology.

Learning map table 210 captures the relationships among learning targets and may also include pre/post-cursor inference values. A postcursor inference value is a value that represents the probability that a student knows the precursor learning target if it can be shown that the student knows the postcursor learning target. A precursor inference value is a value that represents the probability that a student does not know the postcursor learning target if it can be shown that the student does not know the precursor learning target. As shown in table 210, we can determine that at least five learning targets (LT1, LT2, ..., LT5) have been specified because there are five rows in table 210. Each row in table 210 corresponds to one of the five learning targets. The data in a given row specifies the post-cursor relationships between the learning target corresponding to the given row and the other learning targets.

For example, consider the first row of table 210. This row corresponds to learning target LT1. The data in this row indicates that LT2 is the only learning target that is a postcursor of LT1 because cell 250, which corresponds to LT2, includes the pre-cursor and post-cursor inference values, whereas all the other cells in the row do not contain inference values. The inference values included in cell 250 indicate that, if a student doesn't know LT1, then there is a probability of 0.86 that the student also does not know LT2, and if a student knows LT2, then there is a probability of 0.97 that the student also knows LT1.

The second row in table 210, which corresponds to LT2, indicates that LT3 is the only learning target that is a postcursor of LT2. This row also indicates that, if a student doesn't know LT2, then there is a probability of 0.82 that the student also does not know LT3, and if a student knows LT3, then there is a probability of 0.95 that the student also knows LT2.

Table 210 can be used to generate a network diagram (i.e., learning map) that corresponds to table 210. The network diagram has nodes and arcs, wherein the nodes represent the specified learning targets and the arcs represent the specified post-cursor relationships between learning targets. This network diagram forms a learning map. As further described in patent application Ser. No. 10/777,212, learning maps are advantageous for many reasons, including that they can be used to generate efficient tests (i.e., knowledge assessments) that assess one's knowledge of a particular academic content area or across multiple academic areas. Additionally, as described herein, learning maps can be used to generate reports that enable an educator, student or other interested party to visualize a student's performance on an assessment as well as visualize the student's progress over time.

Figure 3:
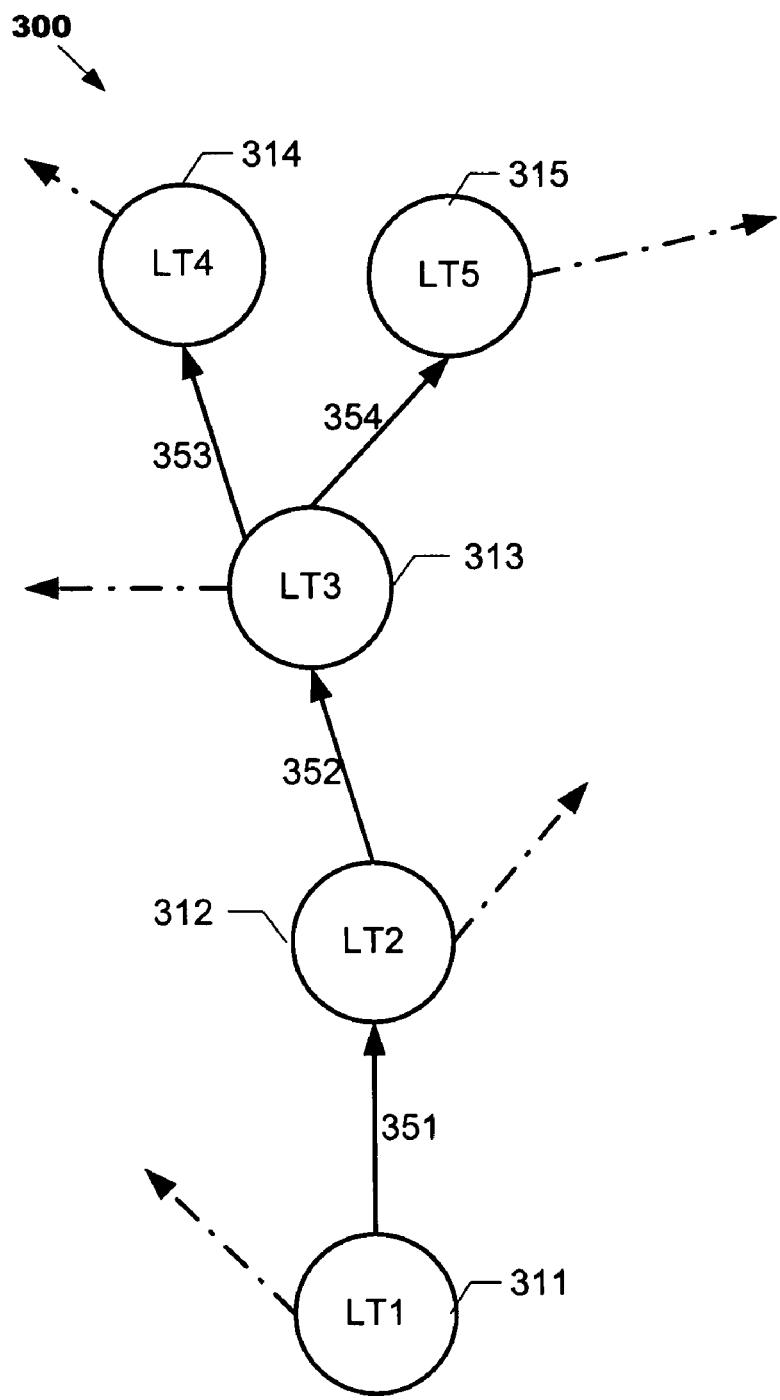
FIG. 3 illustrates a learning map 300 that corresponds to table 210 of FIG. 2B.

Referring now to FIG. 3, FIG. 3 illustrates a learning map 300 that corresponds to table 210. As shown in FIG. 3, learning map 300 includes a set of nodes 311-315, which represent learning targets LT1-LT5, respectively. Learning map 300 also includes arcs 351-354, which illustrate the learning target post-cursor/pre-cursor relationships. The dashed arcs represent that map 300 can be part of a larger map. Preferably, the learning maps are directed, acyclic graphs. In other words, the arcs go in only one direction and there are no cyclic paths within the map.

Referring back to FIG. 2, student table 202 is used to store information about students, such as, for example, the name of each student in a class. The student/learning target table 204 may be used to store information concerning the probability that the student knows (pknown), doesn't know (punknown), and/or forgot (pforgot) the learning targets that are in a learning map. Patent application Ser. No. 10/777,212 discloses a method for populating table 204 with information.

The student/item table 206 is used for storing the students' responses to items and information indicating whether the response is a correct response. For each response to an item, table 206 may also record the date the student provided the response. For example, at the beginning of a semester a student may be given an assessment having ten items (e.g., ten multiple choice questions) and may be given the same or other assessments later in the semester to gauge whether the student is making progress. In such a scenario, table 206 may record not only the student's responses to the items from first assessment, but also the student's responses to the items from all of the other assessments.

The item/learning target table 208 is used to associate items with learning targets. In some embodiments, each item of an assessment may be associated with at least one learning target. Typically, an item is associated with a learning target if a correct response to the item provides evidence that the student comprehends the learning target.

Figure 4:
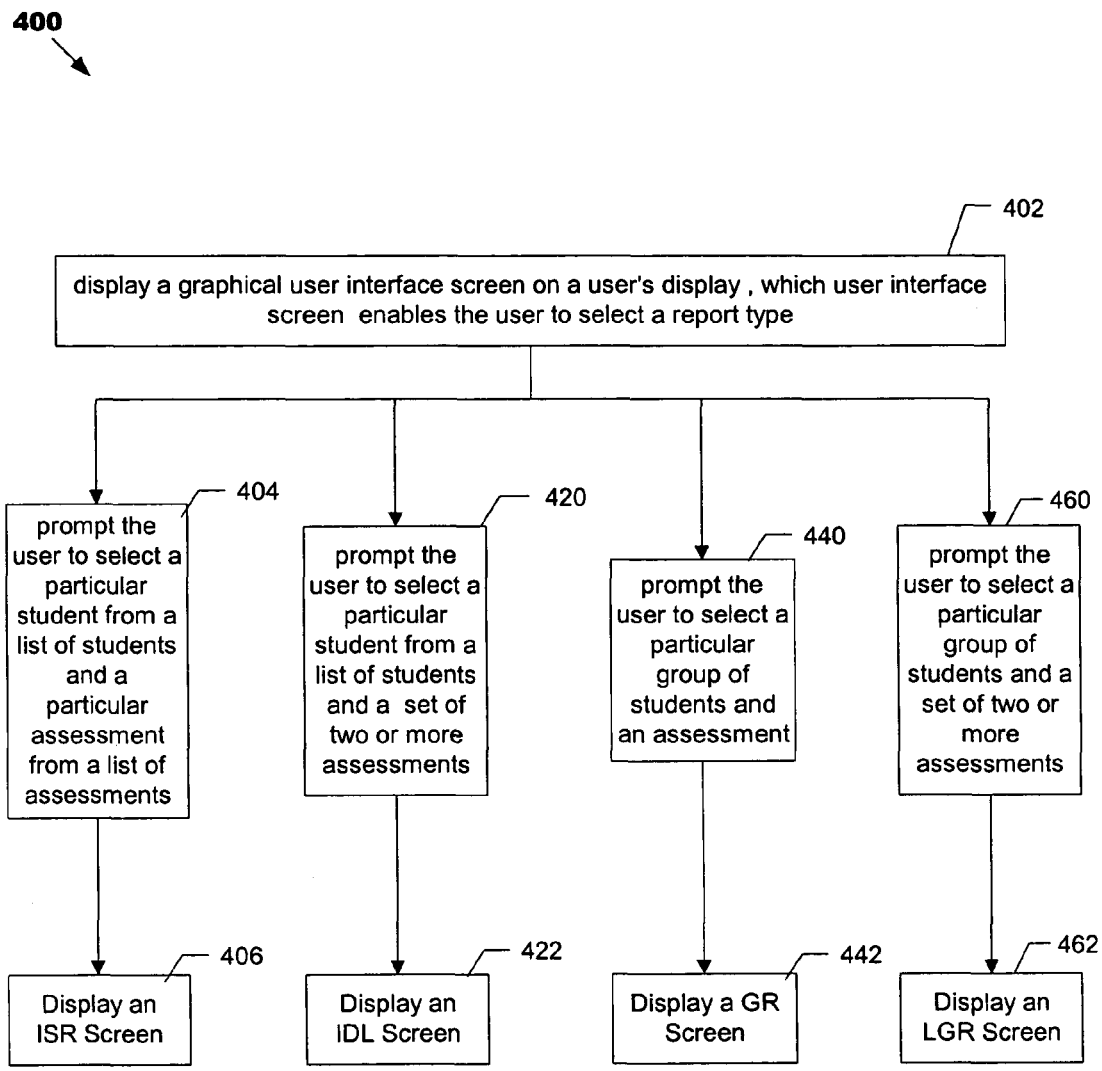
FIG. 4 illustrates a reporting process 400 according to an embodiment of the invention.

Referring now to FIG. 4, FIG. 4 illustrates a reporting process 400 according to an embodiment of the invention. Software 106 may be configured to perform at least some of the steps of process 400.

Process 400 enables a user of system 100 to view and interact with various reports pertaining to a student's or a group of student's mastery of one or more subject areas. Process 400 is, in one embodiment, performed after one or more assessments have been administered to a group of one or more students (e.g., Ms. Jones's third grad class) and scored. That is, for example, process 400 is preferably performed after data has been stored in tables shown in FIG. 2 and described above. Each of the one or more administered assessments targets one or more learning targets. An assessment targets a learning target if the results of the assessment provide useful information for determining whether a student who took the assessment has comprehended the learning target.

Process 400 may begin at step 402, where reporting system 100 displays a graphical user interface screen on a user's display (e.g., a display of user interface system 110. FIG. 5 illustrates a screen 500, according to one embodiment, that may be displayed in step 402. As shown in FIG. 5, screen 500 enables the user to select a report. For example, in one embodiment, the user can choose one of the following reports: (1) an individual student report (if the user selects this report, process 400 may proceed to step 404); (2) an individual longitudinal report (if the user selects this report, process 400 may proceed to step 420); (3) a group report (if the user selects this report, process 400 may proceed to step 440); or (4) a longitudinal group report (if the user selects this report, process 400 may proceed to step 460).

Individual Student Report (ISR)

In step 404, system 100 may prompt the user to select a particular student from a list of students and a particular assessment from a list of assessments that were given to the student. After the user selects a particular student (e.g., Jamie Jones) and selects a particular assessment (e.g., assessment #384 administered on Sep. 1, 2004), process 400 may proceed to step 406.

In step 406, reporting system 100 displays on a user's display a graphical user interface screen that includes at least a segment of a learning map. For example, in one embodiment, each assessment is associated with at least a segment of a learning map and reporting system 100 displays the learning map segment (which may correspond to a strand of learning) that is associated with the selected assessment.

In one embodiment, the learning map segment displayed in step 406 includes, for each item on the assessment, a node corresponding to a learning target that is associated with the item. For example, if the selected assessment includes three items (item1, item2, and item3), and item1 is associated with learning target LT1, item2 is associated with learning target LT2, and item3 is associated with learning target LT3, then the segment of the learning map that gets displayed in step 406 includes a node corresponding to LT1, a node corresponding to LT2 and a node corresponding to LT3.

Figure 6:
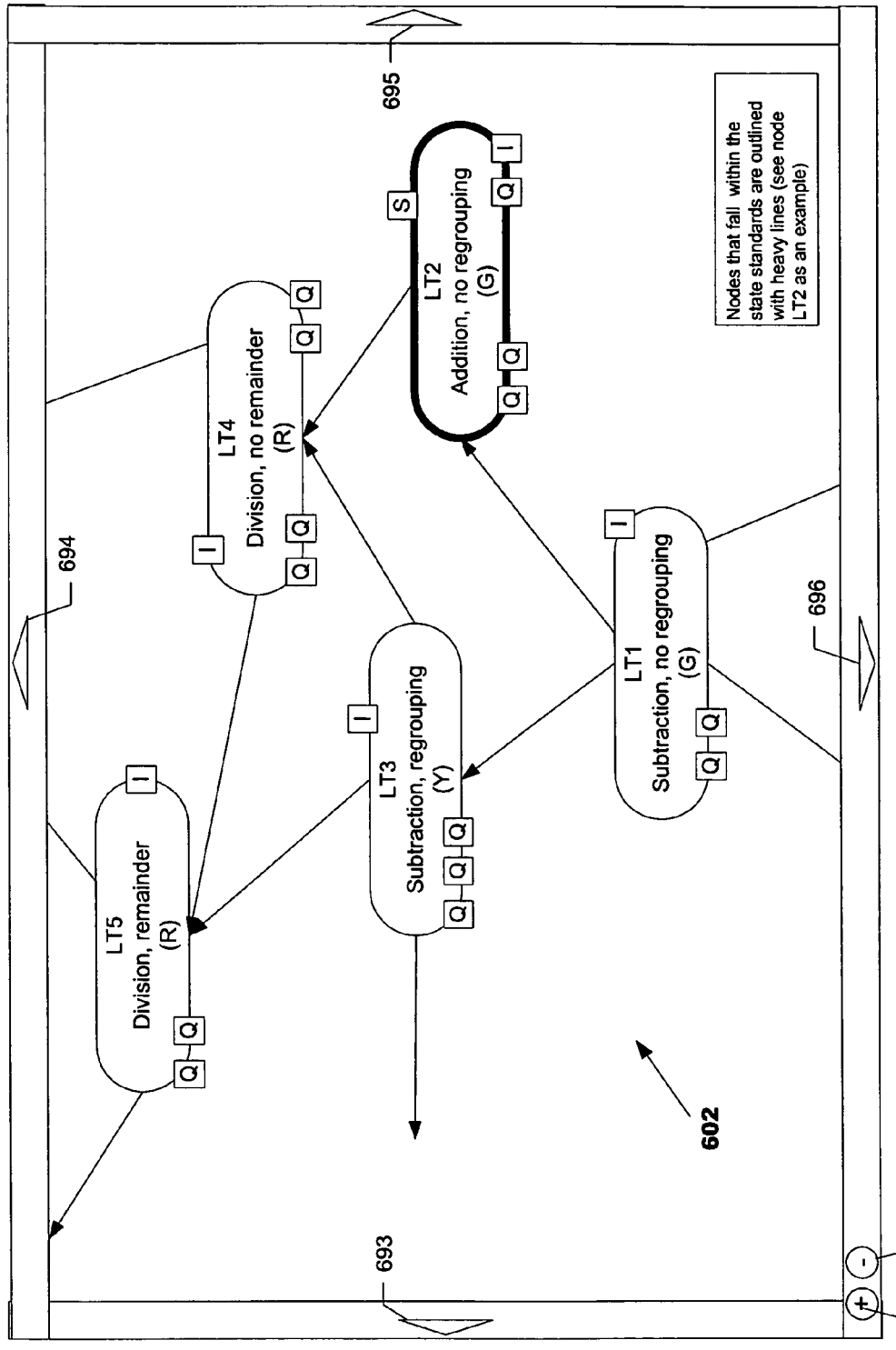

To illustrate the above feature, FIG. 6 is an illustration of an individual student report (ISR) user interface screen 600 that may be displayed in response to selection of a particular student and a particular assessment. As shown in FIG. 6, ISR screen 600 includes at least a segment of a learning map 602, which segment includes a set of nodes, each node representing a learning target. In one embodiment, the map 602 contains a node for each learning target covered on the assessment, as described above.

As shown in FIG. 6, the result of the selected assessment may be represented by differentiated nodes in the learning map 602. For example, the nodes may be differentiated by using the color green (indicated as "(G)" in the figures) for learning targets (nodes) the student has mastered, the color red (indicated as "(R)" in the figures) for learning targets the student has not yet learned, and the color yellow (indicated as "(Y)" in the figures) for learning targets for which the data is inconclusive or for which the data suggests that further instruction may be required. Nodes for which no assessment has yet been administered may be colored white or blue or some other color. The determination of the probability of knows/doesn't know for nodes which will result in "(G)", "(R)", or "(Y)" can be determined by configuration. This allows for different users of the system to determine the allowable error in measurement or reporting mastery and non-mastery (the student has not yet learned) of nodes. For example, one user may wish to configure the system so that a student is deemed to have mastered a learning target if the probability that the student comprehends the learning is greater than 75%, whereas another user may wish to configure the system so that a student is deemed to have mastered a learning target if the probability that the student comprehends the learning is greater than 90%.

The above mentioned color scheme is merely exemplary, and any other color scheme or other scheme for differentiating nodes can be used to differentiate between mastered, not yet learned, further instruction required, or not yet assessed nodes. For example, different types of nodes can have different shapes or background patterns (e.g., stippling or vertical, horizontal, or diagonal crosshatching). Alternatively, distinct sounds may be provided that play when a user "mouses over" each node. Still alternatively, individual nodes can simply have labels indicating whether the node is mastered, not yet learned, requiring further instruction, or not yet assessed.

Selection options (e.g., buttons or menu items or Other selection options) may be provided on screen 600 for enabling a user to select either a report showing results from the most recent assessment taken or a report summarizing the results for all tests taken to date. A user can use the buttons 691 and 692 to zoom the map 602 in and out, respectively, in a manner similar to a user of a digital geographical map. Additionally, elements 693, 694, 695 and 696 are provided to enable the user to scroll up, down, left, and right to see adjacent and related nodes in order to see more post-cursor and pre-cursor nodes in order to gain a greater understanding of the student's progress and of what lies ahead.

In some embodiments, a user is be able to query the shortest route on the learning map from their present knowledge status, as revealed by the green nodes, to the nodes representing a goal, such as state standard or indicator represented by one or more nodes in the learning map. Additionally, a user can jump to regions of the map (e.g., short division) by inputting a natural language or curriculum language instructions, such as: "mathematics, grade3, short division without remainders." In response to a user entering such an instruction, system 100 will display the corresponding region of the map on the user's display. The zoom level of the map can be altered by selecting an increment of time (day/week/month/ quarter year/half year/year/multiple years).

Figure 7:
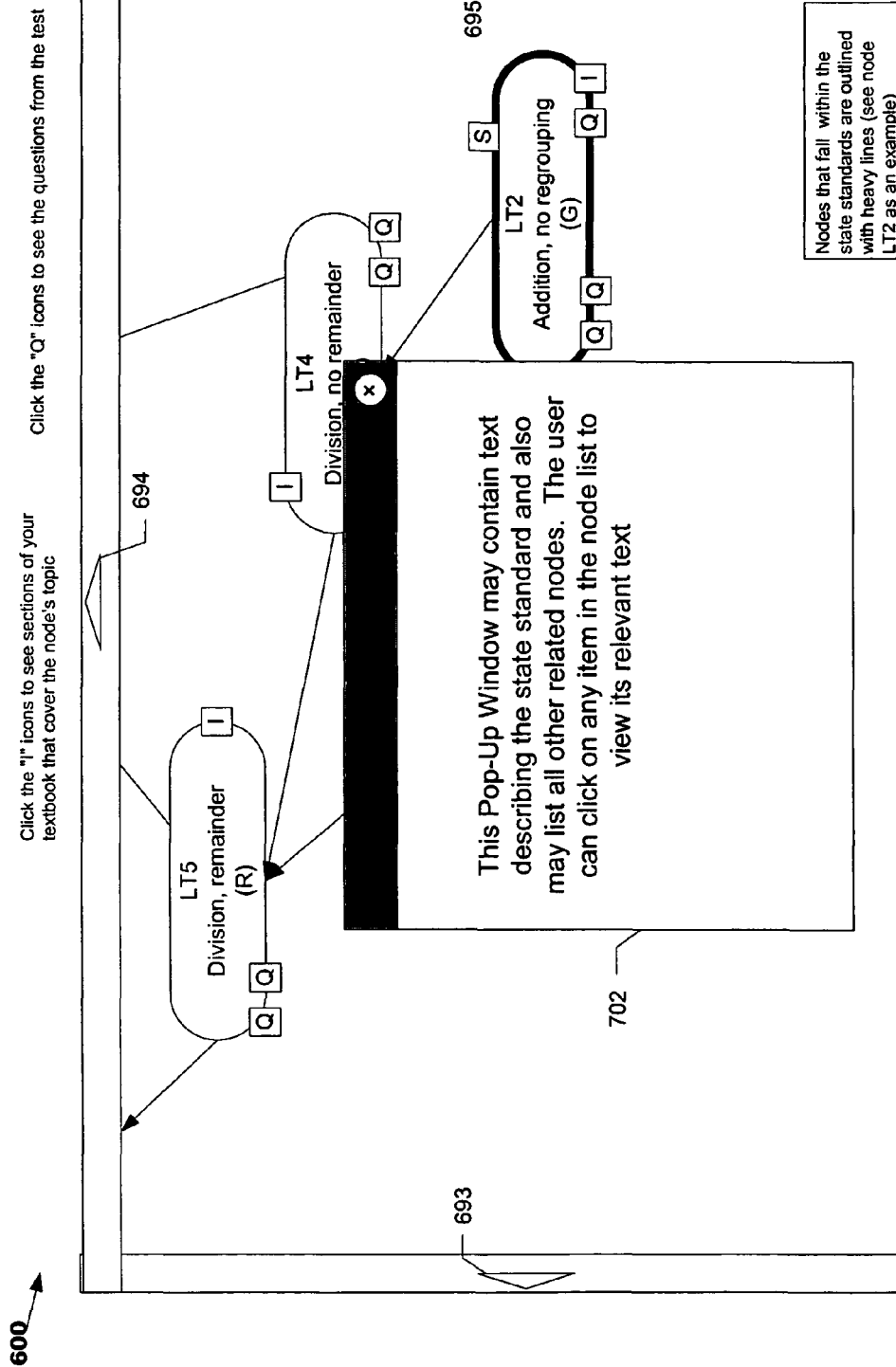

Nodes that are displayed within screen 600 that are associated with learning concepts that fall within a selected or predetermined state's grade-level expectations for learning in that strand may be heavily outlined for emphasis. For example, node 650 is heavily outlined. These nodes may also have "S" icons (or other identifying element) associated therewith. Selecting the "S" icon causes system 100 to display relevant wording from state standards. System 100 may display the wording in a pop-up window or the like. An exemplary state standard pop-up window 702—activated when the "S" icon is selected—is shown in FIG. 7. In one embodiment, indicators in the state standards taxonomy or other taxonomies permit navigating back to their corresponding nodes in the learning map.

Figure 8:
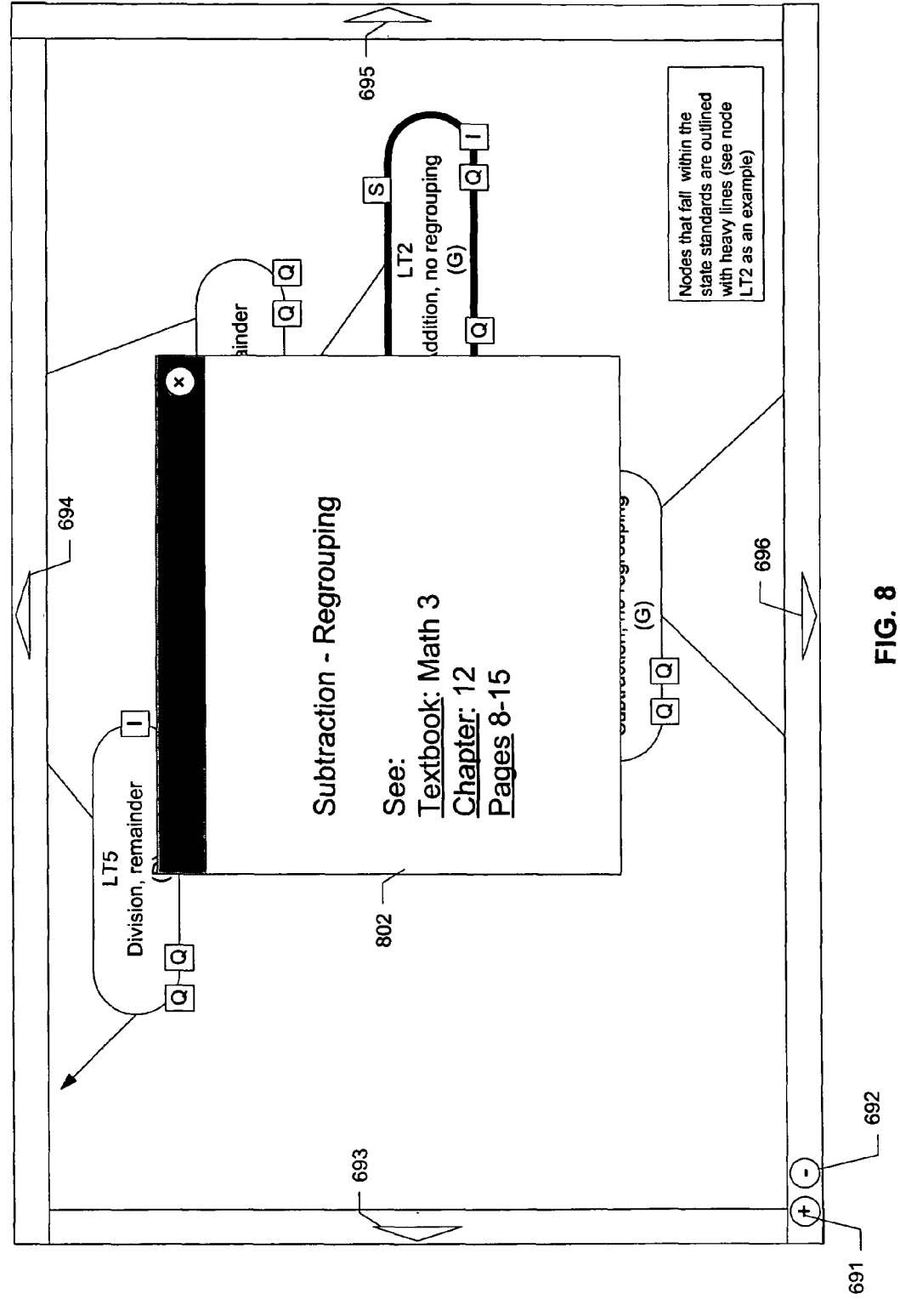

Nodes that are correlated with specific instructional resources may feature an "I" icon or other indicator. Selecting an "I" icon associated with a particular node causes system 100 to display a pop-up window or the like containing information that directs the user to exact locations within selected instructional resources where relevant lessons targeting the skills and concepts represented by the particular node can be found. FIG. 8 shows an exemplary pop-up window 802 that may be displayed in response to the "I" icon corresponding to the "subtraction with regrouping" node has been activated. In cases where the textbook referenced in the pop-up window is available electronically, the pop-up, in one embodiment, includes a hyperlink to the instructional resources identified in the pop-up window. For example, the name of the textbook displayed in the pop-up window (e.g., "Math 3" in the example shown in FIG. 8) can function as a hyperlink so that when the user clicks on the name, the textbook (or portion thereof) can be retrieved and displayed to the user. Additionally, the user may navigate from specific content in the electronic instructional media backwards to the corresponding nodes in the learning map.

Figure 9:
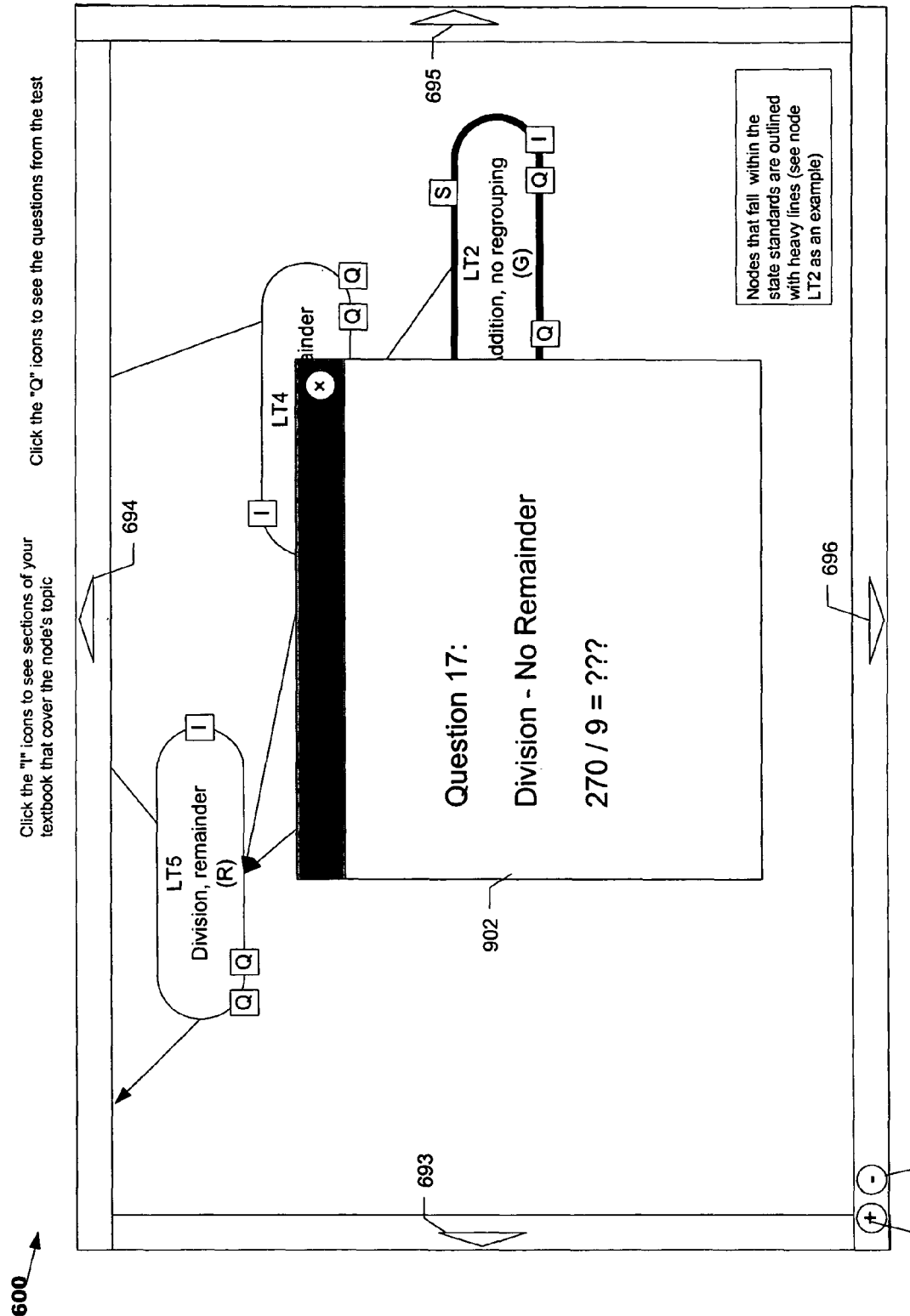

Nodes corresponding to learning targets that were included on the selected assessment may feature "Q" icons (or other indicators), one for each item on the assessment. The "Q" icons may be coded (e.g., color coded) to indicate whether the student correctly responded to the item with which the Q icon is associated. As shown in FIG. 9, selecting (e.g., "clicking on") a Q icon may cause system 100 to display the associated question in a pop-up window 902 or the like. In one embodiment, the answers are not displayed in the window, but students can still see what each specific question they missed or got right. Alternatively, the correct answer can be provided in the pop-up window 902 along with the question.

The ISR screen 600 (or a report similar to the ISR screen) can be printed and sent home with students for their parents to review. In addition, online versions of the report can be provided for access over a distributed network, for example, the Internet. For online versions, appropriate security features, for example restricted authorizations and password access, are desirable.

Educators will find ISR screen 600 to be a useful tool in evaluating a student. Simply by glancing at the screen 600, a teacher can quickly determine the learning targets that the student knows and doesn't know. The teacher can then help focus the student in those areas were the student's skill appear to be lacking. Students will find the screens useful tool for self-evaluation and assistance in learning.

Pre-cursor and post-cursor relationships that appear in these reports, allow teachers and students to identify learning targets that may need to be learned in order to acquire a targeted skill. They may also use them to identify learning targets that may be able to be learned in the future.

It is expected that a teacher using system 100 will use the system 100 to display an ISR screen for each student in the teacher's class. This will enable the teacher to give more individualized instruction to each student, because, simply by reviewing each students' ISR screen, the teacher can quickly determine the areas that need to be focused on for each student. For example, an ISR screen for one student may indicate that the student should focus on three learning targets: (D) multiplication regrouping; (F) subtraction regrouping; and (H2) long division, whereas an ISR screen for a different student may indicate that this other student need only focus on learning division. In this way, the ISR screens provide a powerful tool to educators.

Individual Longitudinal Report (IDL)

Referring back to FIG. 4 and step 420, in step 420, system 100 may prompt the user to select a particular student from a list of students and a set of two or more assessments from a list of assessments that were given to the student. After the user selects a particular student (e.g., Jamie Jones) and selects the set of assessments, process 400 may proceed to step 422.

In step 422, reporting system 100 displays on the user's display a graphical user interface screen that includes at least a segment of a learning map. For example, in one embodiment, each assessment is associated with at least a segment of a learning map, and reporting system 100 displays a learning map segment that encompasses all the segments associated with the selected assessments.

That is, in one embodiment, the learning map segment displayed in step 422 includes, for each item on each selected assessment, a node corresponding to a learning target that is associated with the item. For example, if one of the selected assessments includes an item (item1), and item1 is associated with learning target LT1, and another of the selected assessments includes an item (e.g., item77), and item77 is associated with learning target LT77, then the segment of the learning map that gets displayed in step 422 includes a node corresponding to LT1 and a node corresponding to LT77.

Figure 10:
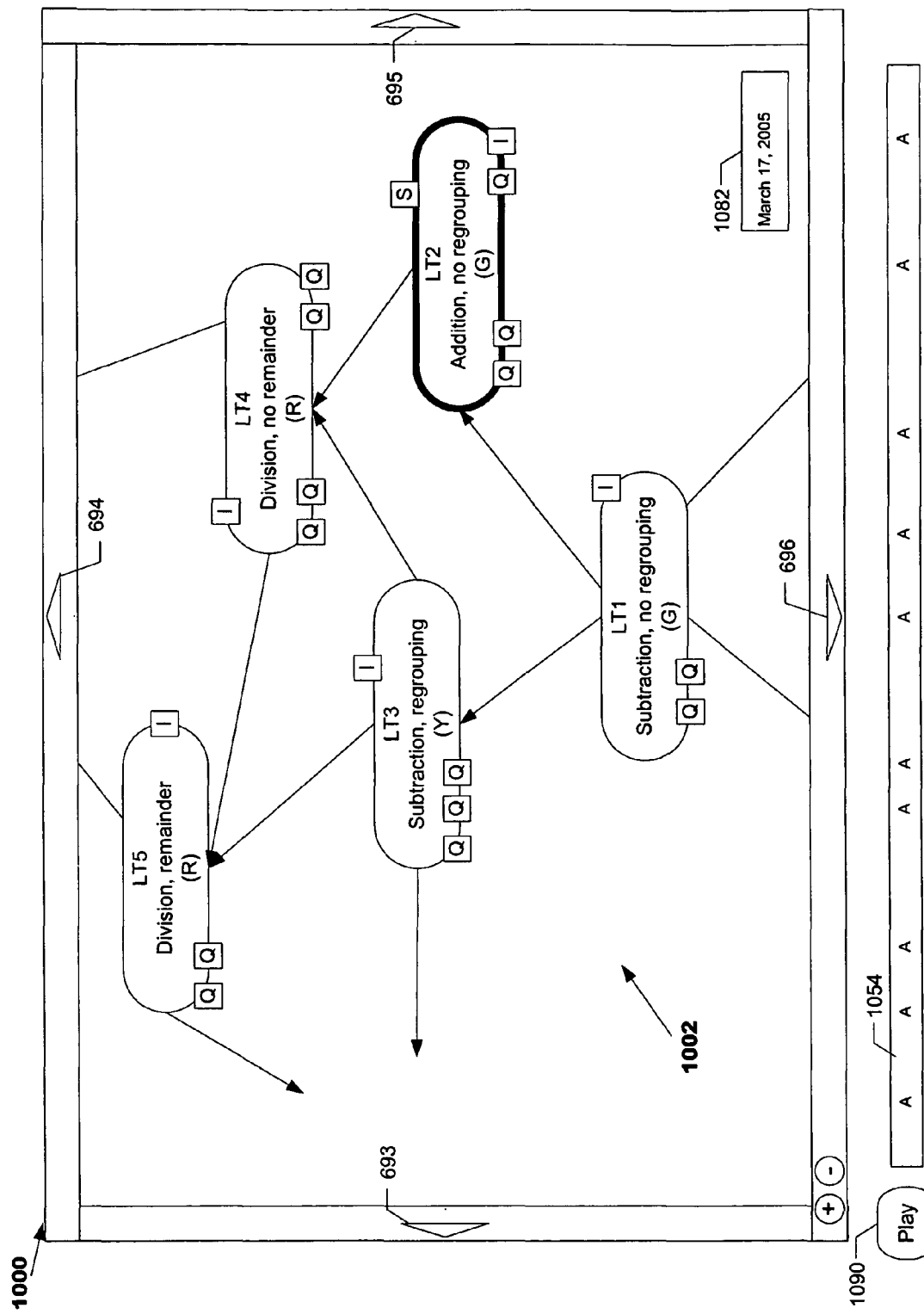

To illustrate the above feature, FIG. 10 is an illustration of an individual longitudinal report (IDL) user interface screen 1000 that may be displayed in step 422. As shown in FIG. 10, IDL screen 1000 includes at least a segment 1002 of a learning map, which segment 1002 includes a set of nodes, each node corresponding to a learning target. In one embodiment, the segment 1002 contains a node for each learning target covered by one of the selected assessments, as described above.

Figure 15:
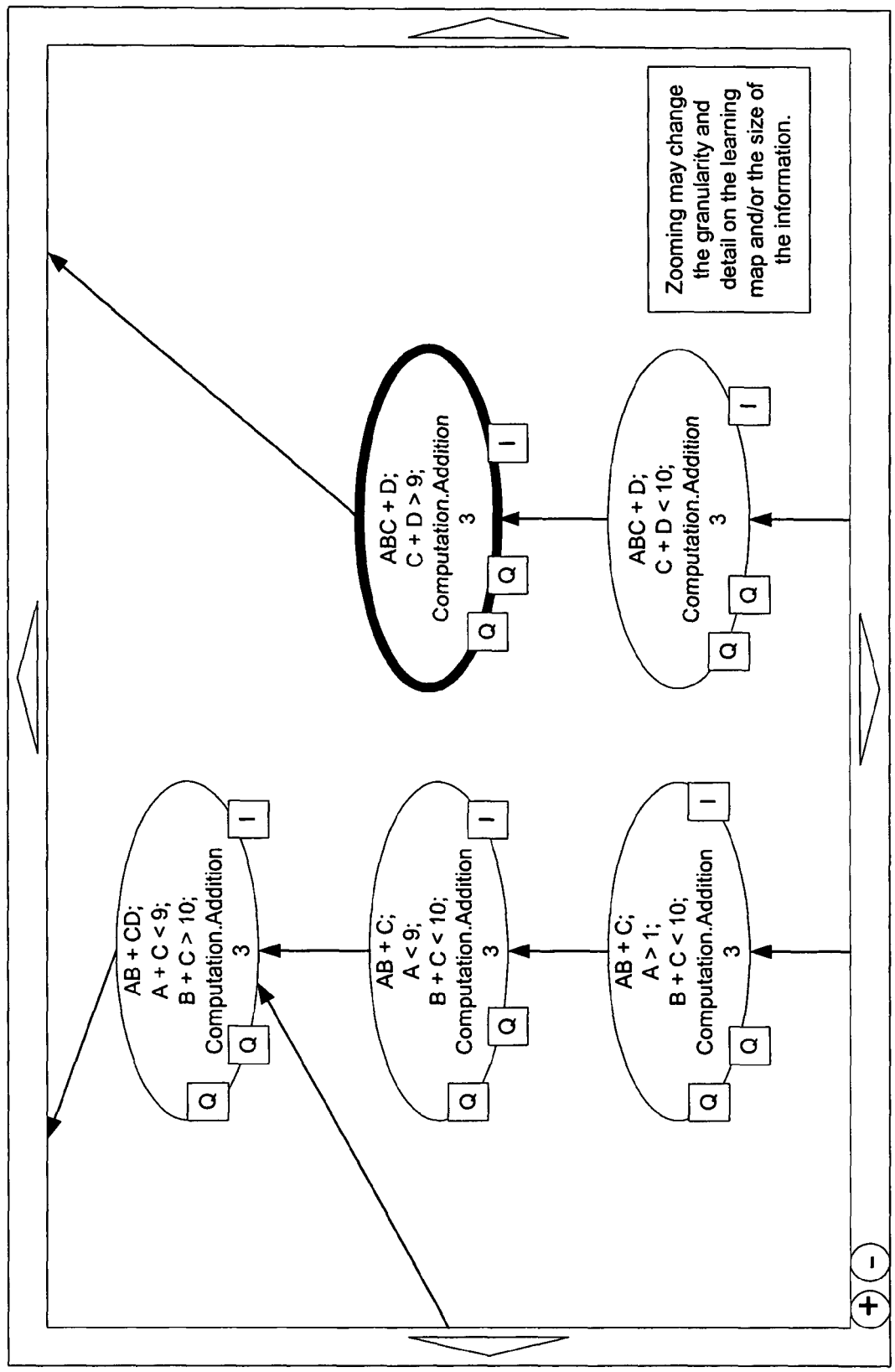

The IDL screen 1000 is used to display the results from the selected assessments. The results are presented within the paradigm of a network of nodes in a learning map, visibly coded (e.g., color coded) as described above and/or sound coded to represent a student's achievement status in a particular strand of learning during the course of a school year. The default display of nodes may be "zoomed out" to a greater extent than the view on the ISR screen 600 in order to give the user a better overall look at the concepts of the learning strand that have been covered over time. It will be appreciated that the degree of granularity in the data displayed in the learning map may differ in granularity based on the zoom level selected by the user. Greater detail of learning targets may be displayed (see FIG. 15) as the user zooms in, and lesser detail as the user zooms out. This is similar to zooming in on a geographical map where the street names are displayed as the user zooms in, and cities as the user zooms out.

A user can again zoom in and out and navigate through the map segment 1002 to choose other views. The user also select a "Play" button 1090 on IDL screen 1000 in order to display the test results in sequence and observe the student's progress as nodes change from red to yellow to green.

More specifically, in response to activation of the play button 1090, system 100 initially codes the nodes on map 1002 according to the results of an earlier assessment (e.g., a node on the map may initially be colored red to indicate that the results of the first assessment indicates that the student has not learned the concept associated with the node). As discussed above, the results of assessments may be stored in a database, thus, system 100 may first retrieve information from the database prior to coding the nodes on the map. After initially coding the nodes, system 100 may pause for a predetermined delay and then recode the nodes on map 1002 according to the results of the next selected assessment. For example, the node that was initially colored red may change to the color green because the results of the second assessment may indicate that the student has learned the concepts associated with the node.

The user can also select any one of the particular assessments and view the ISR screen for that given assessment. For example, in one embodiment, a "timeline" 1054 is displayed on the IDL screen 1000. Indicia (e.g., the letter "A") is displayed on the timeline 1054 and each indicia is associated with one of the assessments selected in step 420. Accordingly, to select any one of the particular assessments, the user may use a mouse or the like to select an "A," by, for example, "clicking on" the "A" or merely hovering the cursor over the "A." In response to the user selecting an "A" on the timeline, system 100 codes map 1002 according to the assessment associated with the selected "A."

As shown in FIG. 10, IDL screen 1000 includes a date display area 1082. The date displayed in the display area 1082 corresponds to the date of the assessment that is being used to code the nodes on the map. So, for example, if a user selects a particular assessment using the timeline 1054, the nodes of the map will be coded according to the assessment and the date the assessment was given to the student will appear in the date display area 1082.

Typically, for example, the IDL screen 1000 permits the student/viewer to browse backward from the selected assessment to view the results of all tests taken in this strand. In addition, the IDL screen 1000 is constructed and arranged such that the user can browse backward from nodes (blue in color) in the learning map that are prior to the nodes for which assessment occurred, or forward to preview the lessons and learning targets in nodes note yet assessed (blue in color) leading up to and including the nodes representing the state's grade-level expectations for learning in that strand, or any set of pre-defined learning expectations established for any purpose. Because tests can be delivered on a daily or weekly basis, or any other increment/schedule desired, the assessments are spaced out on a timeline that reflects the relative difference in timing between assessments.

The IDL screen 1000 features the same "S," "I," and "Q" icons and navigational methodologies that are described above with respect to the ISR screen 600 for the viewer's reference.

Figure 11:
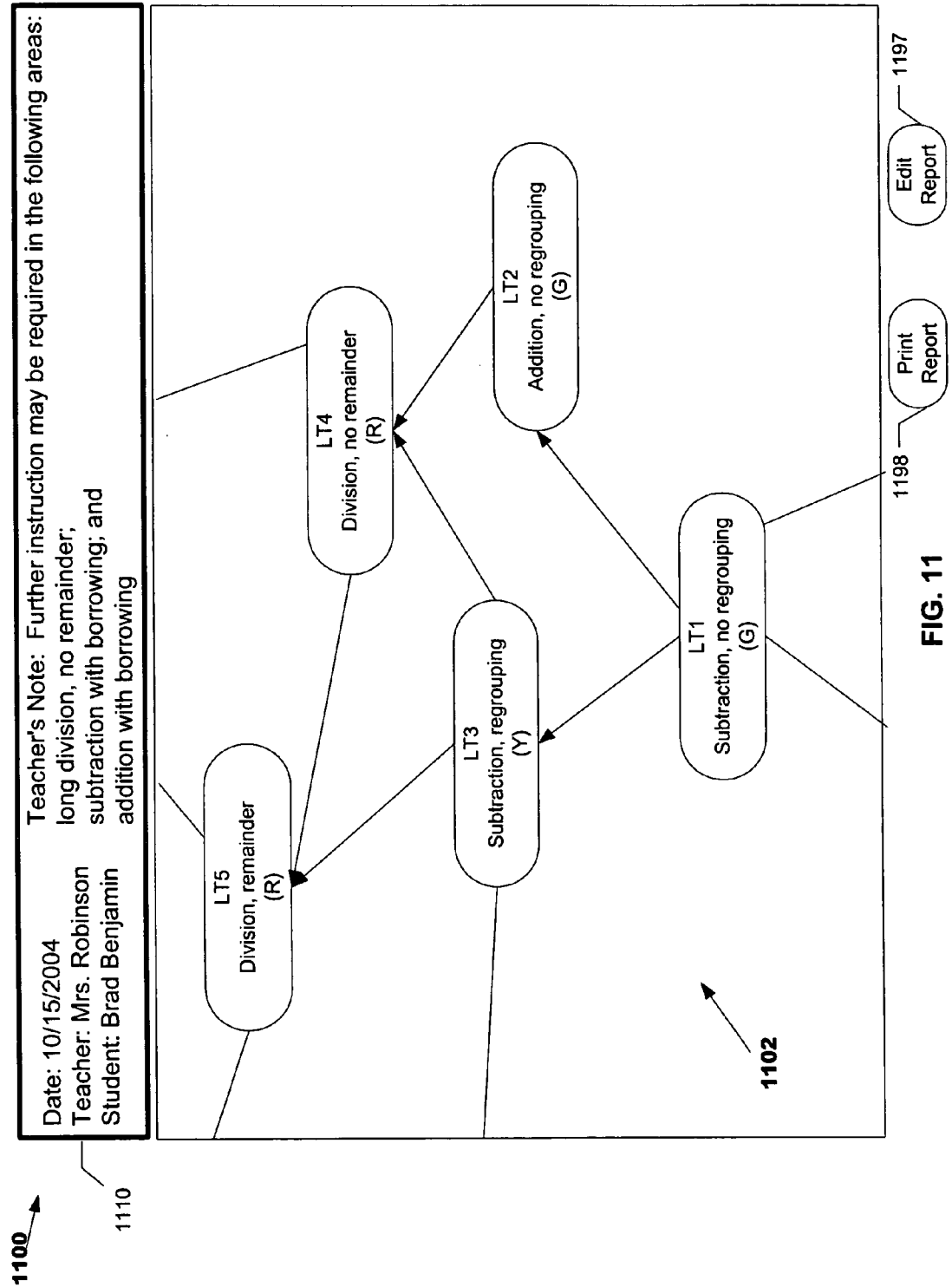

Referring now to FIG. 11, FIG. 11 shows a preview screen 1100 showing a preview of a report showing a student's results of an assessment, which report can be printed so that the student can take the report home to his/her parents or guardians. System 100 displays the preview screen 1100 in response to the user selecting a report button or menu option. The preview screen 1100 allows a teacher to preview—and edit if necessary—a student's report prior to printing the report. As shown in FIG. 11, the report includes a segment 1102 of a learning map. Like the nodes displayed in ISR screen 600, the nodes of the segment 1102 are coded according to the student's answers to the selected assessment. The report may include a banner 1110 which, in addition to identifying the date, teacher, student, and report, also provides teacher notes, which may, for example, indicate particular learning targets that require specific attention. If the teacher wants to edit the report (e.g., the teacher may wish to edit the Teacher's Note in the banner), the teacher can select edit button 1197. To print the report, the teacher may select print button 1198.

The Group Report (GR)

Referring back to FIG. 4 and step 440, in step 440, system 100 may prompt the user to select a particular group of students (e.g., Mrs. Johnson's third grade class, for example) from a list of students and an assessment from a list of assessments that were given to the selected group of students. After the user selects a particular student group and selects an assessment, process 400 may proceed to step 442.

In step 442, reporting system 100 displays on the user's display a Group Report (GR) screen that includes at least a segment of a learning map. In one embodiment, the learning map segment displayed in step 442 includes, for each item on the selected assessment, a node corresponding to a learning target that is associated with the item. For example, if the selected assessment includes three items (item1, item2, and item3), and item1 is associated with learning target LT1, item2 is associated with learning target LT2, and item3 is associated with learning target LT3, then the segment of the learning map that gets displayed in step 442 may include a node corresponding to LT1, a node corresponding to LT2 and a node corresponding to LT3.

Figure 12:
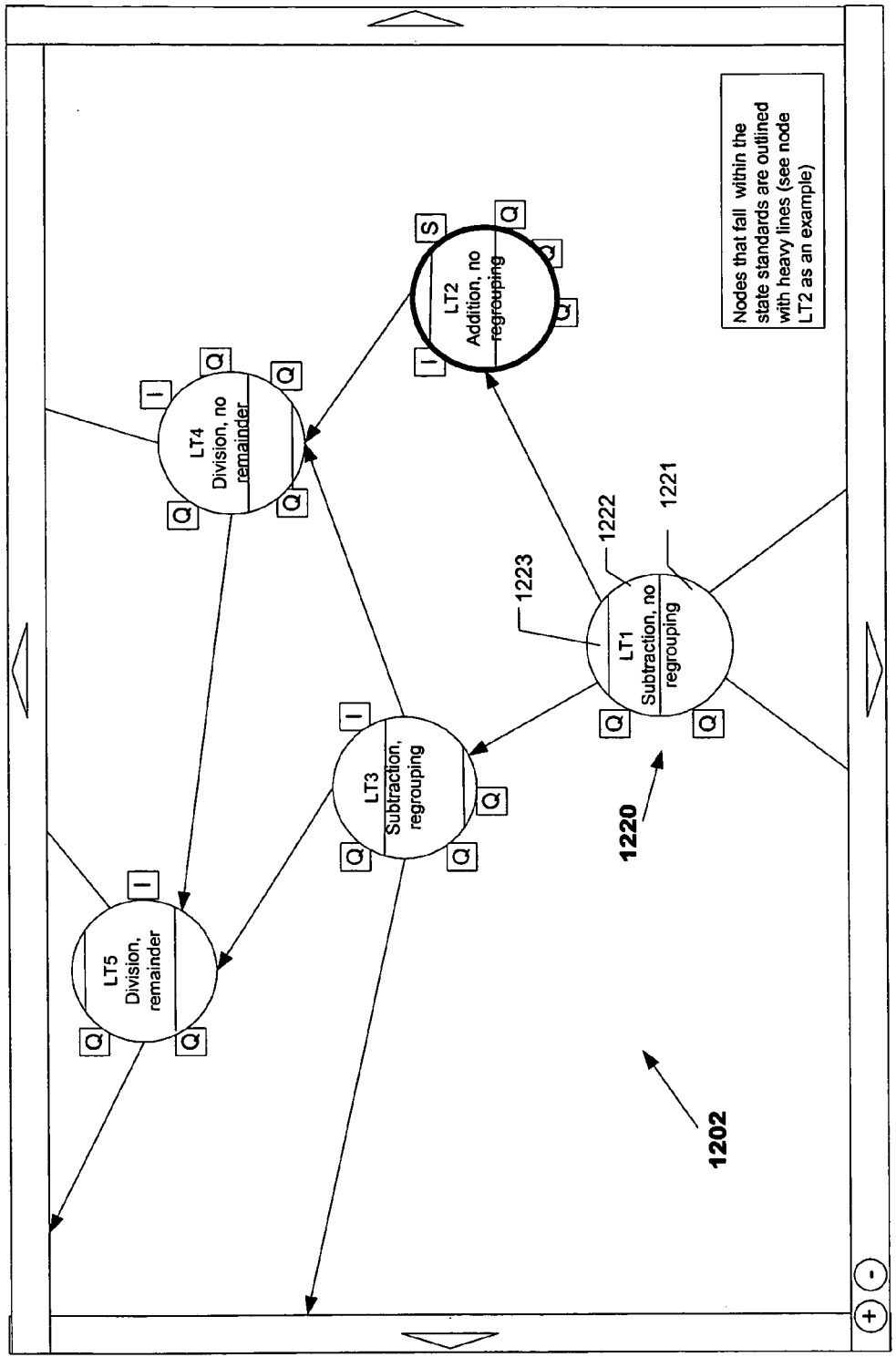

To illustrate the above feature, FIG. 12 shows an exemplary GR screen 1200 that may be displayed in step 442. As shown in FIG. 12, GR screen 1200 includes at least a segment of a learning map 1202, which segment 1202 includes a set of nodes, each node representing a learning target. In one embodiment, the map 1202 contains a node for each learning target covered on the assessment, as described above.

A GR screen, such as GR screen 1200, represents the assessment results of any selected group on any segment of a learning map (i.e., "learning strand," such as mathematics computation, for example) by displaying color-coded horizontal bands within the nodes of the learning map segment.

In the example GR screen 1200 shown, the horizontal bands, in order from the bottom of the node to the top, are green, yellow, and red. The widths of the green and red bands are proportional to the number of students who have mastered (green) or who have not yet achieved (red) the learning target of the node in question. An intermediate yellow band represents the percentage of students having assessment results for which data is inconclusive or for which further instruction may be required.

As a specific example, consider the node 1220, which corresponds to learning target LT1. As shown in FIG. 12, node 1220 is divided into three bands (band 1221, band 1222, and band 1223). Although not illustrated in the drawings because the drawings are not in color, in one embodiment, band 1221 is colored green, band 1222 is colored yellow, and band 1223 is colored red. In a similar fashion, the other nodes displayed in screen 1200 may also divided into at least two or more color coded bands. In alternative embodiments, indicia other than color may be used to differentiate the bands in node. For example, different amounts of shading could be used to differentiate the bands.

Figure 13:
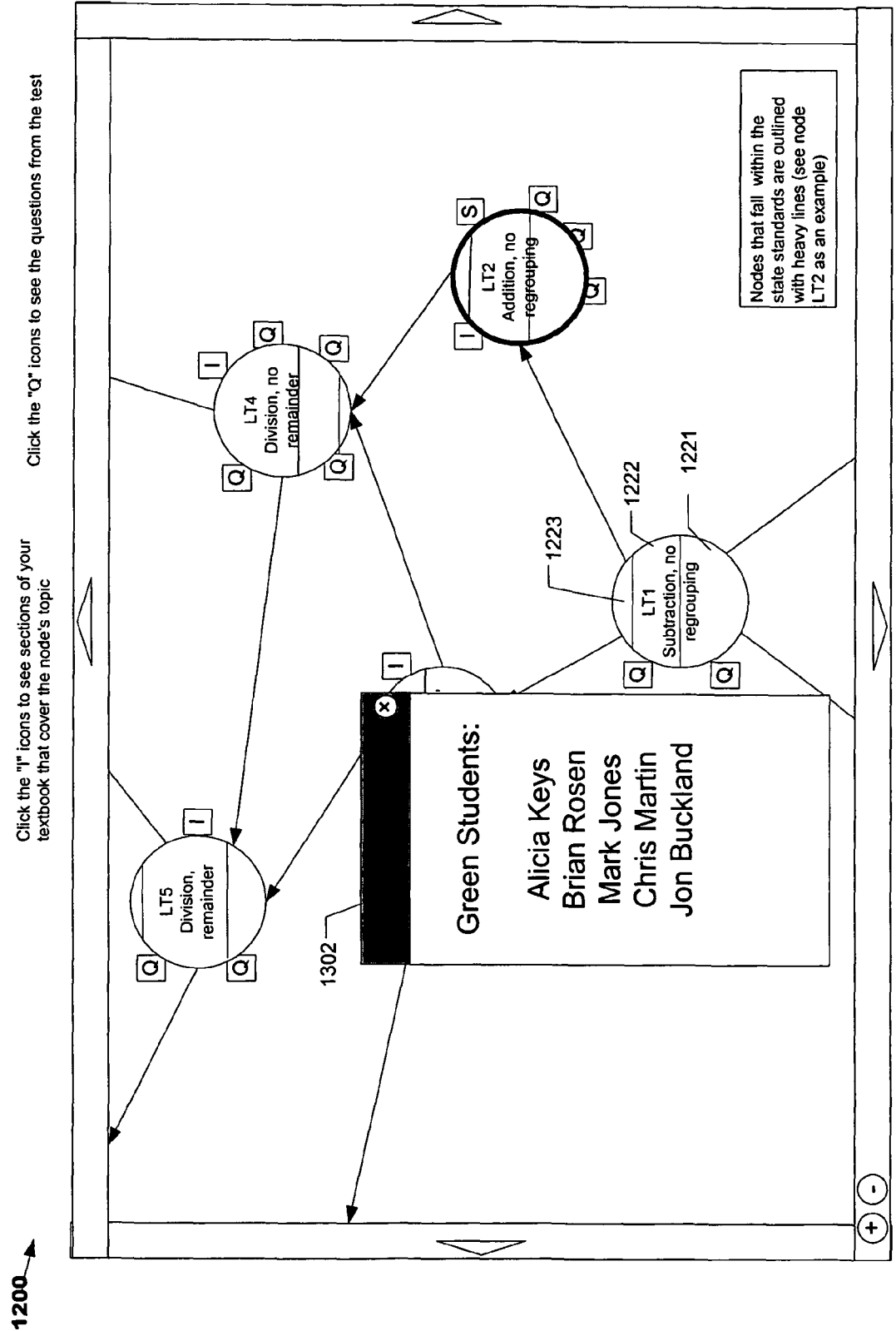

As shown in FIG. 13, selecting any one of the bands in a node causes system 100 to display a list of students in a pop-up window 1302 or the like. The list of students in pop-up window 1302 constitutes the students represented by the selected color in that node. For example, if the user selects the green color band 1221 in node 1220 (by, for example, positioning a cursor over the band and clicking a mouse button), the list will consist of all of the students from the target group who have mastered the learning target associated with node 1220. Similarly, if the user selects the red color band in a node, the list will consist of all of the students from the target group who have not yet achieved the learning target of the node. In some embodiments, each listed name may function as a hyperlink to the student's ISR screen for the assessment selected in step 440. For example, a user can click on a name in the pop-up window 1302, and, in response, process 400 may proceed to step 406 where an ISR screen is displayed for the selected student and for the assessment selected in step 440.

Each node in map 1202 may also include a fourth band of a different color (e.g., blue) which represents the fraction of the class not yet assessed relative to that learning target. Furthermore, the GR screen 1200 may be constructed and arranged so as to automatically zoom and navigate the view so that the GR screen will be primarily displaying any nodes that were most recently assessed for that group. The display may also automatically zoom and navigate to display the most useful information for the viewer (e.g., the point on the map at which more than 25% of the students have not mastered nodes that are pre-cursors to nodes aligned to state standards).

The GR screen 1200, in one embodiment, features the same "S," "I," and "Q" icons and navigational methodologies that are found in the ISR screen 600.

Longitudinal Group Report (LGR)

Referring back to FIG. 4 and step 460, in step 460, system 100 may prompt the user to select a group of students and a set of two or more assessments from a list of assessments that were given to the selected group of students. After the user selects a group of students and selects the set of assessments, process 400 may proceed to step 462.

In step 462, reporting system 100 displays on the user's display a graphical user interface screen that includes at least a segment of a learning map. In one embodiment, the learning map segment displayed in step 462 includes, for each item on each selected assessment, a node corresponding to a learning target that is associated with the item. For example, if one of the selected assessments includes an item (item1), and item1 is associated with learning target LT1, and another of the selected assessments includes an item (e.g., item77), and item77 is associated with learning target LT77, then the segment of the learning map that gets displayed in step 462 includes a node corresponding to LT1 and a node corresponding to LT77.

Figure 14:
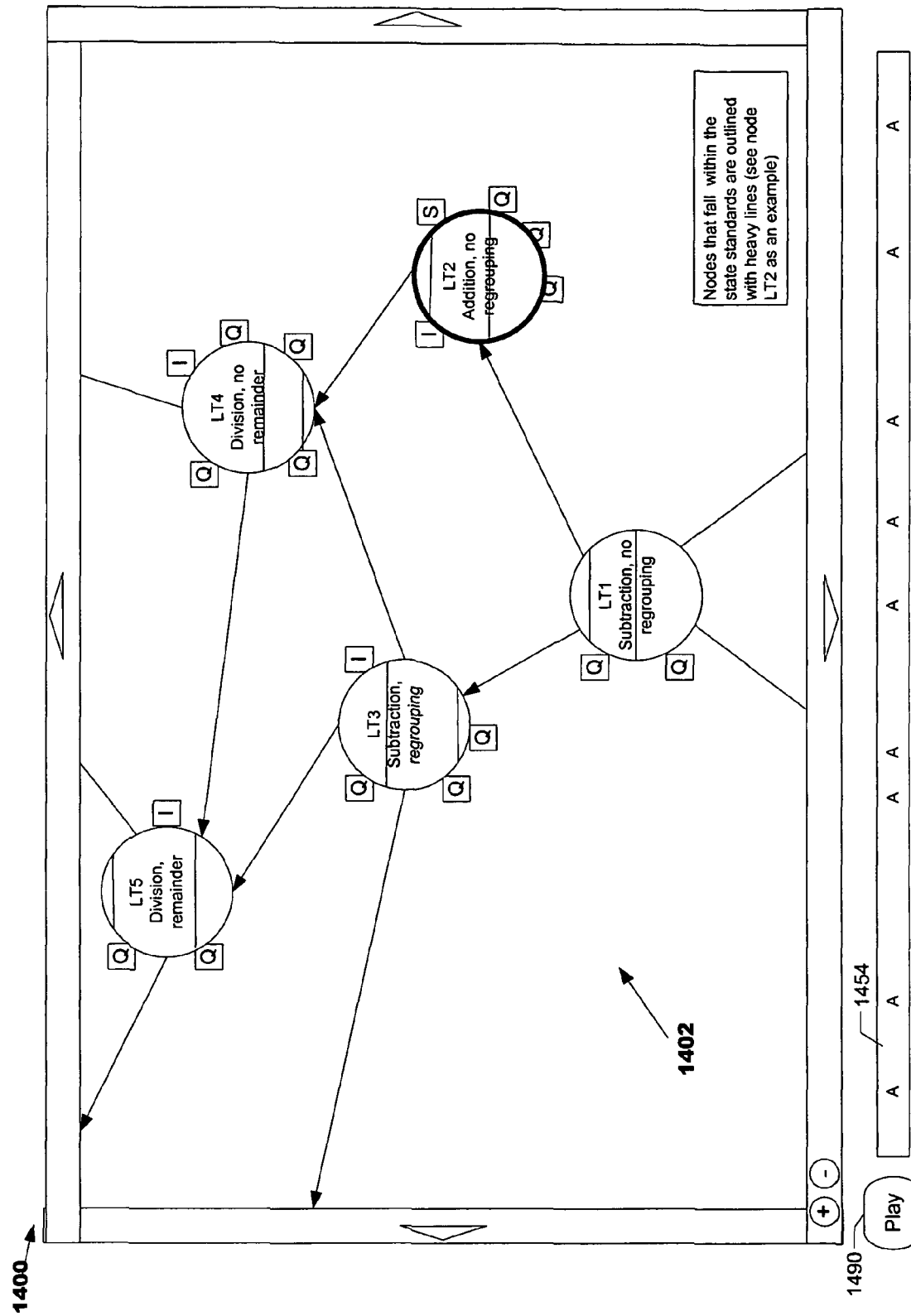

To illustrate the above feature, FIG. 14 is an illustration of an longitudinal group report (LGR) user interface screen 1400 that may be displayed in step 462. As shown in FIG. 14, LGR screen 1400 includes at least a segment 1402 of a learning map, which segment 1402 includes a set of nodes, each node corresponding to a learning target. In one embodiment, the segment 1402 contains a node for each learning target covered by one of the selected assessments.

Like the GR screen 1200, the LGR screen 1400 represents the assessment results of any target group (Mrs. Johnson's third grade class, for example) on any learning strand (mathematics computation, for example) by displaying the color-coded horizontal bands (referred to and explained above) in nodes of the learning map for the strand. The LGR screen 1400, in one embodiment, provides substantially the same viewing and navigational options as the IDL screen 1000. For example, a user can again zoom in and out and navigate through the map to choose other views. The user can also select a "Play" button 1490 on the LGR screen 1400 in order to display group test results in a timed sequence and observe the group's progress as nodal bands change color and width.

In one embodiment, if desired, the navigation may automatically shift up, down, left, or right while the report is playing. The zoom level may be automatically controlled during the play with or without the automatic navigation control.

The user can also select any one of the particular assessments and view the GR screen for that given assessment. For example, in one embodiment, a "timeline" 1454 is displayed on the LGR screen 1400. Indicia is displayed on the timeline 1454 and each indicia is associated with one of the assessments selected in step 460. Accordingly, to select any one of the particular assessments, the user may select one of the indicia. In response, system 100 displays a GR screen corresponding to the assessment associated with the selected indicia and corresponding to the group of students selected in step 460.

In some embodiments, the heavy outline around nodes associated with a standard or goal may change in appearance when all learners have achieved the standard or goal. The LGR screen 1400 features the same "S," "I," and "Q" icons and navigational methodologies that are found in the ISR screen 600 for the viewer's reference. As with the GR screen 1200, the teacher can select a colored band in a node to bring up the associated student lists.

Conclusion

It will be readily apparent that the various processes and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added and other steps omitted, and the order of the steps may be re-arranged. In other words, any sequence or order of steps that may be described does not necessarily indicate a requirement that the steps be performed in that order. The steps of processes described herein may be performed in any order practical. Further, some steps may be performed simultaneously.

What is claimed is:

1. A computer implemented method for reporting student progress in an academic content area or other domain of learning, comprising:

receiving, on a computer-readable medium, results of an assessment to a student, the assessment having one or more questions, at least one question of the assessment being associated with a first learning target;

recording, on the same or a different computer-readable medium, the student's response to the question associated with the first learning target;

using a computer processor to determine a student's knowledge state with respect to the first learning target based at least in part on the student's response to the question associated with the first learning target;

providing a report on a computer display comprising a segment of a learning map, wherein the segment of the learning map comprises (1) a first node labeled to indicate it is associated with the first learning target, (2) a second node associated with a second learning target that is a pre-cursor of the first learning target, and (3) a third node associated with a third learning target that is a post-cursor of the first learning target, the nodes being graphically interconnected in a manner so as to reflect pre- and post-cursor relationships between the learning targets associated with the nodes, and wherein the report further comprises navigation elements that enable the user to scroll the segment of the learning map up, down, left, and right, thereby enabling the user to view additional nodes of the learning map;

using the computer processor to differentiate each respective node, to visually indicate on the computer display (1) whether the student has mastered the learning target associated with the node, (2) whether the student has not yet learned the learning target associated with the node, (3) whether there is insufficient information to determine the knowledge state of the student with respect to the learning target associated with the node, or (4) whether the student has not yet been assessed on the learning target associated with the node; and loading onto the same or a different computer-readable medium code enabling a viewer to view a question associated with the first learning target.

2. The method of claim 1, further comprising providing means enabling a viewer to identify instructional content material associated with said first learning target.

3. The method of claim 1, further comprising providing means enabling a viewer to view a standard associated with a learning target.

4. The method of claim 1, wherein said report graphically represents student progress on each of a plurality of assessments the student has taken and the method further comprises providing means enabling a viewer of the report to view a learning map at a point in time corresponding to a one of said plurality of assessments.

5. The method of claim 4, further comprising providing means for animating the learning map to demonstrate sequential changes in the status of the student's progress over the course of the plurality of assessments.

6. The method of claim 1, wherein the step of differentiating each respective node comprises color coding each respective node and/or sound coding each respective node.

7. The method of claim 6, wherein the node is colored green to indicate that the student has mastered the learning target associated with the node.

8. The method of claim 1, wherein the step of providing the report comprises displaying a graphical user interface screen comprising the report.

9. A computer implemented method for reporting a student's progress relative to a segment of a learning map comprising a first, second and third learning target, said method comprising:

receiving, on a computer-readable medium, results of an assessment to the student, the assessment having a first question and a second question, the first question being associated with the first learning target and the second question being associated with the second learning target;

recording, onto the same or a different computer readable medium, the student's response to the first question and the student's response to the second question;

using a computer processor to determine the student's knowledge state with respect to the first learning target based at least in part on the student's response to the first question;

using a computer processor to determine the student's knowledge state with respect to the second learning target based at least in part on the student's response to the second question;

displaying on a display device a user interface comprising a segment of a learning map, wherein the segment of the learning map comprises a first node labeled to indicate it corresponds to the first learning target, a second node labeled to indicate it corresponds to the second learning target and a third node labeled to indicate it responds to the third learning target, the nodes being graphically interconnected in such a manner so as to reflect pre-cursor and post cursor relationships between the learning targets corresponding to the nodes, and wherein the user interface further comprises navigation elements that enable the user to scroll the segment of the learning map up, down, left, and right, thereby enabling the user to view additional nodes of the learning map; and using a computer processor to differentiate each respective node to indicate to a user of the interface (1) whether the student has mastered the learning target associated with the node, (2) whether the student has not yet learned the learning target associated with the node, or (3) whether there is insufficient information to determine the knowledge state of the student with respect to the learning target associated with the node.

10. The method of claim 9, wherein the step of differentiating each respective node comprises color coding each respective node.

11. The method of claim 10, wherein the step of color coding each respective node comprises color coding a node green if the student has mastered the learning target associated with the node.

12. The method of claim 11, wherein the step of color coding each respective node comprises color coding a node red if the student has not yet learned the learning target associated with the node.

13. The method of claim 11, wherein the step of color coding each respective node comprises color coding a node yellow if there is not enough information to determine the student's knowledge of the learning target associated with the node.

14. The method of claim 9, wherein the user interface further comprises a button that enables the user to zoom-out on the learning map.

15. The method of claim 9, wherein the user interface further comprises a button that enables the user to zoom-in on the learning map.

16. The method of claim 9, wherein the user interface further comprises an first icon associated with the first question, the first icon being positioned on or adjacent to the first node.

17. The method of claim 16, wherein the first icon is coded to enable the user of the user interface to determine whether the student provided an incorrect response to the first question.

18. The method of claim 17, wherein the first icon is color coded to enable the user of the user interface to determine whether the student provided an incorrect response to the first question.

19. The method of claim 18, wherein the question is displayed in a pop-up window in response to the user selecting the first icon.

20. The method of claim 9, wherein the user interface further comprises an icon associated with instructional materials directed to the first learning target, the icon being positioned on or adjacent to the first node.

21. A computer implemented student reporting method, comprising:
receiving, on a computer readable medium, results of an assessment to a group of students, the assessment having one or more questions, at least one question of the assessment being associated with a first learning target;
recording, on the same or a different computer-readable medium, the students' responses to the question associated with the first learning target;
using a computer processor to determine each student's mastery of the first learning target based at least in part on the student's response to the question associated with the first learning target to determine the percentage of students who have mastered the first learning target and the percentage of students in the group who have not yet learned the first learning target;
providing a report on a computer display comprising a segment of a learning map, wherein the segment of the learning map comprises (1) a first node labeled to indicate it is associated with the first learning target, (2) a second node associated with a second learning target that is a pre-cursor of the first learning target, and (3) a third node associated with a third learning target that is a post-cursor of the first learning target, the nodes being graphically interconnected in a manner so as to reflect pre- and post-cursor relationships between the learning targets associated with the nodes, and wherein the report further comprises navigation elements that enable the user to scroll the segment of the learning map up, down, left, and right, thereby enabling the user to view additional nodes of the learning map; and
using a computer processor to differentiate each respective node to visually indicate on the computer display (1) the percentage of the students in the group who have mastered the learning target associated with the node and (2) the percentage of the students in the group who have not yet learned the learning target associated with the node.

22. The method of claim 21, further comprising providing a selectable icon for enabling a user to view a question associated with the first learning target.

23. The method of claim 21, further comprising providing a selectable icon for enabling a user to obtain instructional resources related to the first learning target.

24. The method of claim 21, wherein the step of differentiating each respective node comprises color coding each respective node and/or sound coding each respective node.

25. The method of claim 24, wherein the step of differentiating each respective node comprises coloring a first portion of a node a first color and coloring a second portion of said node a second color.

26. The method of claim 25, wherein the first portion is sized according to a function of the percentage of the students in the group who have mastered the learning target associated with that node and the second portion is sized according to a function of the percentage of the students in the group who have not yet learned the learning target associated with that node.

27. A non-transitory computer readable program storage medium embodying instructions executable by a computer system for reporting student progress relative to a plurality of learning targets corresponding to an academic content area or other domain of learning, said instructions being executable by the computer system to:
receive, on the same or a different computer-readable medium, results of an assessment to a student, the assessment having one or more questions, at least one question of the assessment being associated with a first learning target;
record, on the same or a different computer-readable medium, the student's response to the question associated with the first learning target;
determine a student's knowledge state with respect to the first learning target based at least in part on the student's response to the question associated with the first learning target;
provide a report on a computer display comprising a segment of a learning map, wherein the segment of the learning map comprises (1) a first node labeled to indicate it is associated with the first learning target, (2) a second node associated with a second learning target that is a pre-cursor of the first learning target, and (3) a third node associated with a third learning target that is a post-cursor of the first learning target, the nodes being graphically interconnected in such a manner as to reflect pre- and post-cursor relationships between the learning targets associated with the nodes, and wherein the report further comprises navigation elements that enable the user to scroll the segment of the learning map up, down, left, and right, thereby enabling the user to view additional nodes of the learning map;
differentiate each respective node to visually indicate on the computer display (1) whether the student has mastered the learning target associated with the node, (2) whether the student has not yet learned the learning target associated with the node, (3) whether there is insufficient information to determine the knowledge state of the student with respect to the learning target associated with the node, or (4) whether the student has not yet been assessed on the learning target associated with the node; and
load onto the same or a different computer-readable medium code enabling a viewer to view a question associated with the first learning target.

* * * * *